(12) United States Patent
Kuo et al.

(10) Patent No.: US 11,653,301 B2
(45) Date of Patent: May 16, 2023

(54) WAKE-UP SIGNAL AND PREAMBLE DESIGN FOR MOBILE COMMUNICATIONS

(71) Applicant: MediaTek Inc., Hsinchu (TW)

(72) Inventors: Chun-Hsuan Kuo, Hsinchu (TW);
Jiann-Ching Guey, Hsinchu (TW);
Chiou-Wei Tsai, Hsinchu (TW);
Chien-Chang Li, Hsinchu (TW);
Cheng Rung Tsai, Hsinchu (TW)

(73) Assignee: MediaTek Inc.

( * ) Notice: Subject to any disclaimer, the term of this patent is extended or adjusted under 35 U.S.C. 154(b) by 98 days.

(21) Appl. No.: 16/537,537

(22) Filed: Aug. 10, 2019

(65) Prior Publication Data
US 2020/0053646 A1    Feb. 13, 2020

Related U.S. Application Data

(60) Provisional application No. 62/717,499, filed on Aug. 10, 2018.

(51) Int. Cl.
*H04W 52/02*    (2009.01)
*H04W 24/08*    (2009.01)
(Continued)

(52) U.S. Cl.
CPC ....... *H04W 52/0229* (2013.01); *H04L 5/0051* (2013.01); *H04L 5/0055* (2013.01);
(Continued)

(58) Field of Classification Search
CPC ... H04W 52/0235; H04W 76/28; Y02D 30/70
See application file for complete search history.

(56) References Cited

U.S. PATENT DOCUMENTS

2014/0334320 A1*  11/2014  Liu ................. H04L 5/0098
370/252
2017/0332358 A1   11/2017  Park et al.
(Continued)

FOREIGN PATENT DOCUMENTS

CN      107690829 A    2/2018
CN      108353427 A    7/2018
(Continued)

OTHER PUBLICATIONS

China National Intellectual Property Administration, International Search Report and Written Opinion for PCT/CN2019/100229, dated Nov. 13, 2019.
(Continued)

*Primary Examiner* — Phirin Sam
*Assistant Examiner* — Debebe A Asefa
(74) *Attorney, Agent, or Firm* — Han IP PLLC; Andy M. Han (57) ABSTRACT

Various solutions for wake-up signal and preamble design for mobile communications are described. An apparatus, while in a first mode of operation, receives a wake-up signal (WUS) from a network. In response to receiving the WUS, the apparatus switches to a second mode of operation from the first mode of operation. The apparatus then detects a preamble in downlink (DL) transmissions from the network. In response to detecting the preamble, the apparatus monitors a physical downlink control channel (PDCCH) to check for an uplink (UL) transmission grant for the apparatus from the network.

17 Claims, 5 Drawing Sheets

(51) Int. Cl.
　　　H04W 72/14　　(2009.01)
　　　H04L 5/00　　　(2006.01)
　　　H04W 74/08　　(2009.01)
　　　H04W 8/00　　　(2009.01)
(52) U.S. Cl.
　　　CPC .......... H04W 8/005 (2013.01); H04W 24/08 (2013.01); H04W 72/14 (2013.01); H04W 74/0808 (2013.01)

(56) References Cited

U.S. PATENT DOCUMENTS

2019/0349815 A1* 11/2019 Tiirola .................. H04W 28/26
2020/0029302 A1*　1/2020 Cox .................. H04W 52/0229

FOREIGN PATENT DOCUMENTS

| JP | P2018-512809 A | 5/2018 |
| WO | WO 2017067573 A1 | 4/2017 |
| WO | WO 2018074068 A1 | 4/2018 |

OTHER PUBLICATIONS

Taiwan Intellectual Property Office, Office Action for Taiwan Patent Application No. 108128612, dated May 25, 2020.

* cited by examiner

WAKE-UP SIGNAL AND PREAMBLE DESIGN FOR MOBILE COMMUNICATIONS

CROSS REFERENCE TO RELATED PATENT APPLICATION(S)

The present disclosure is part of a non-provisional application claiming the priority benefit of U.S. Patent Application No. 62/717,499, filed on 10 Aug. 2018, the content of which is incorporated by reference in its entirety.

TECHNICAL FIELD

The present disclosure is generally related to mobile communications and, more particularly, to wake-up signal and preamble design for mobile communications.

BACKGROUND

Unless otherwise indicated herein, approaches described in this section are not prior art to the claims listed below and are not admitted as prior art by inclusion in this section.

In mobile communications such as Long-Term Evolution (LTE) and New Radio (NR), listen-before-talk (LBT) is a mechanism used by communication devices such as user equipment (UE) for clear channel assessment before transmitting on a given communication channel. That is, a UE performs LBT before any transmission and, if no other transmission is detected during the listening phase of the LBT, the UE can proceed with transmission. As such, a base station (e.g., eNodeB or gNB) can start its transmission at any time. Correspondingly, UEs in wireless communication with the base station would perform LBT before transmission, and this would result in significant power consumption on the part of the UEs.

For NR in unlicensed (NR-U) bands, a frame boundary of radio frames is established between a base station (e.g., gNB) and a UE. Typically, a radio frame contains ten sub-frames (or slots) and, typically, each sub-frame (or slot) contains fourteen orthogonal frequency-division multiplexing (OFDM). Accordingly, a device could potentially start its transmission at any symbol in a sub-frame (or slot) due to the uncertainty of LBT.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that may minimize or otherwise reduce the amount of monitoring for LBT (and associated power consumption) for UEs by the user of a wake-up signal. Another objective of the present disclosure is to propose solutions or schemes that may minimize or otherwise reduce the complexity in monitoring for LBT (and associated power consumption) for UEs by the user of a preamble.

In one aspect, a method may involve a processor of an apparatus in a first mode of operation receiving a wake-up signal (WUS) from a network. The method may also involve the processor switching, responsive to receiving the WUS, to a second mode of operation from the first mode of operation. The method may further involve the processor detecting a preamble in downlink (DL) transmissions from the network. The method may additionally involve the processor monitoring, responsive to detecting the preamble, a physical downlink control channel (PDCCH) to check for a transmission grant for the apparatus from the network.

In one aspect, an apparatus may comprise a communication device capable of wirelessly communicating with a wireless network. The apparatus may also comprise a processor communicatively coupled to the communication device. The processor may be capable of receiving, via the communication device when in a first mode of operation, a WUS from a network. The processor may also be capable of switching, responsive to receiving the WUS, to a second mode of operation from the first mode of operation. The processor may further be capable of detecting, via the communication device, a preamble in DL transmissions from the network. The processor may additionally be capable of monitoring, via the communication device responsive to detecting the preamble, a PDCCH to check for a transmission grant for the apparatus from the network.

It is noteworthy that, although description provided herein may be in the context of certain radio access technologies, networks and network topologies such as LTE, LTE-Advanced, LTE-Advanced Pro, 5th Generation (5G), NR, Internet-of-Things (IoT) and Narrow Band Internet of Things (NB-IoT), the proposed concepts, schemes and any variation(s)/derivative(s) thereof may be implemented in, for and by other types of radio access technologies, networks and network topologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

OVERVIEW

Implementations in accordance with the present disclosure relate to various techniques, methods, schemes and/or solutions pertaining to power-efficient mechanism for multi-link operation with respect to user equipment and network apparatus in mobile communications. According to the present disclosure, a number of possible solutions may be implemented separately or jointly. That is, although these possible solutions may be described below separately, two or more of these possible solutions may be implemented in one combination or another.

Figure 1:
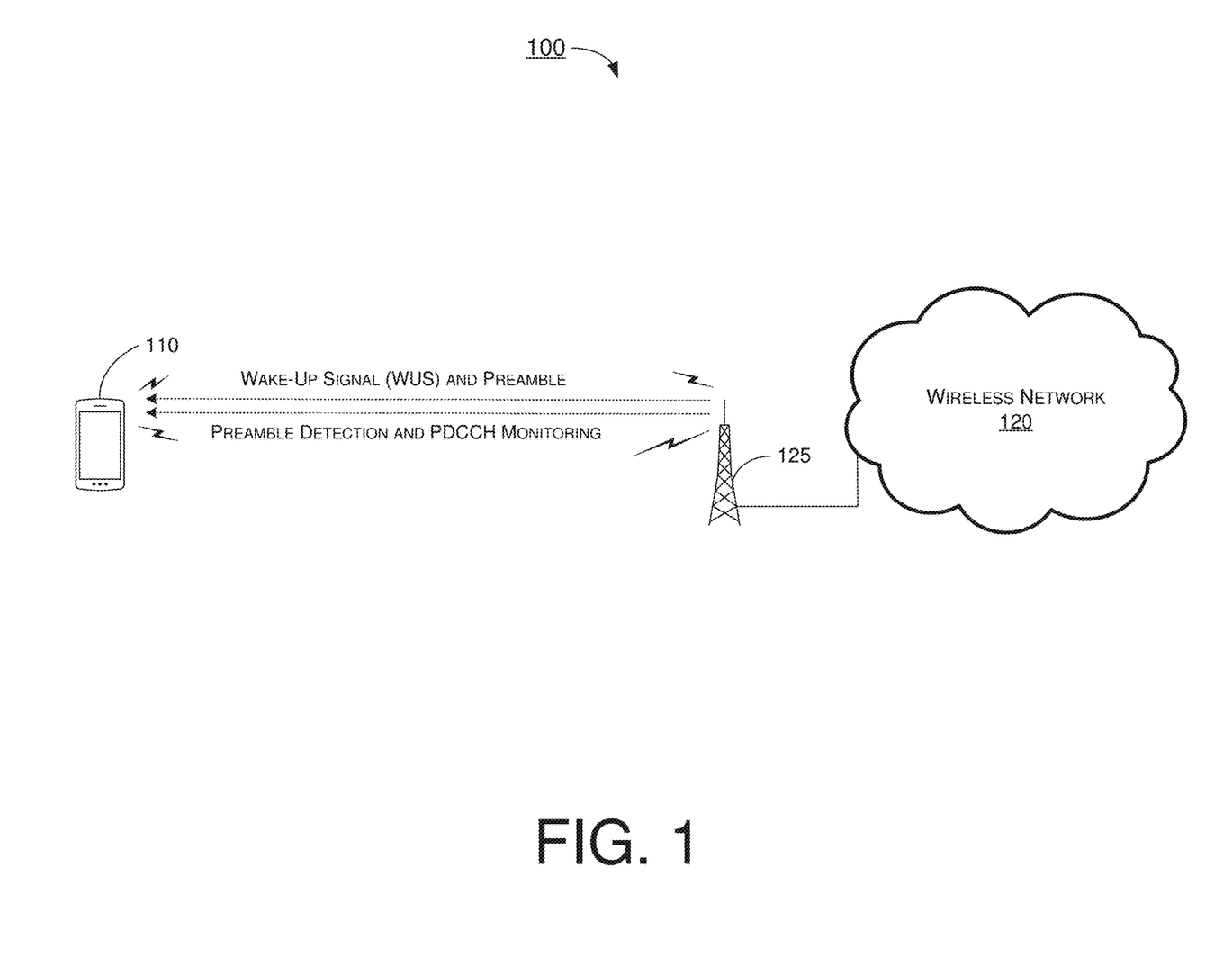
FIG. 1 is a diagram of an example network environment in which various solutions and schemes in accordance with the present disclosure may be implemented.

FIG. 1 illustrates an example network environment 100 in which various solutions and schemes in accordance with the present disclosure may be implemented. Referring to FIG. 1, network environment 100 may involve a UE 110 in wireless communication with a wireless network 120 (e.g., a 5G NR mobile network) via a base station 125 (e.g., a gNB or transmit-receive point (TRP)). In network environment 100, UE 110 and wireless network 120 may implement various schemes pertaining to wake-up signal (WUS) and preamble design for mobile communications in accordance with the present disclosure. For instance, UE 110 may receive, and network 120 may transmit, a WUS and a preamble in accordance with various schemes proposed herein. The follow description of various solutions and schemes in accordance with the present disclosure is provided with reference to FIG. 1.

Under a proposed scheme in accordance with the present disclosure, a WUS may be utilized to wake up a UE when necessary. This may be beneficial for the UE with respect to power saving or reduction in power consumption. Under the proposed scheme, the WUS may be embedded in a discovery reference signal (DRS) to reduce excessive LBT overhead. Moreover, under a proposed scheme in accordance with the present disclosure, a preamble may be utilized to indicate a beginning of a channel occupancy time (COT). This may reduce physical downlink control channel (PDCCH) monitoring effort on the part of the UE at times outside a COT. Under the proposed scheme, the preamble may also indicate a structure of the COT. This may reduce the PDCCH monitoring effort on the part of the UE at times inside a COT.

Figure 2:
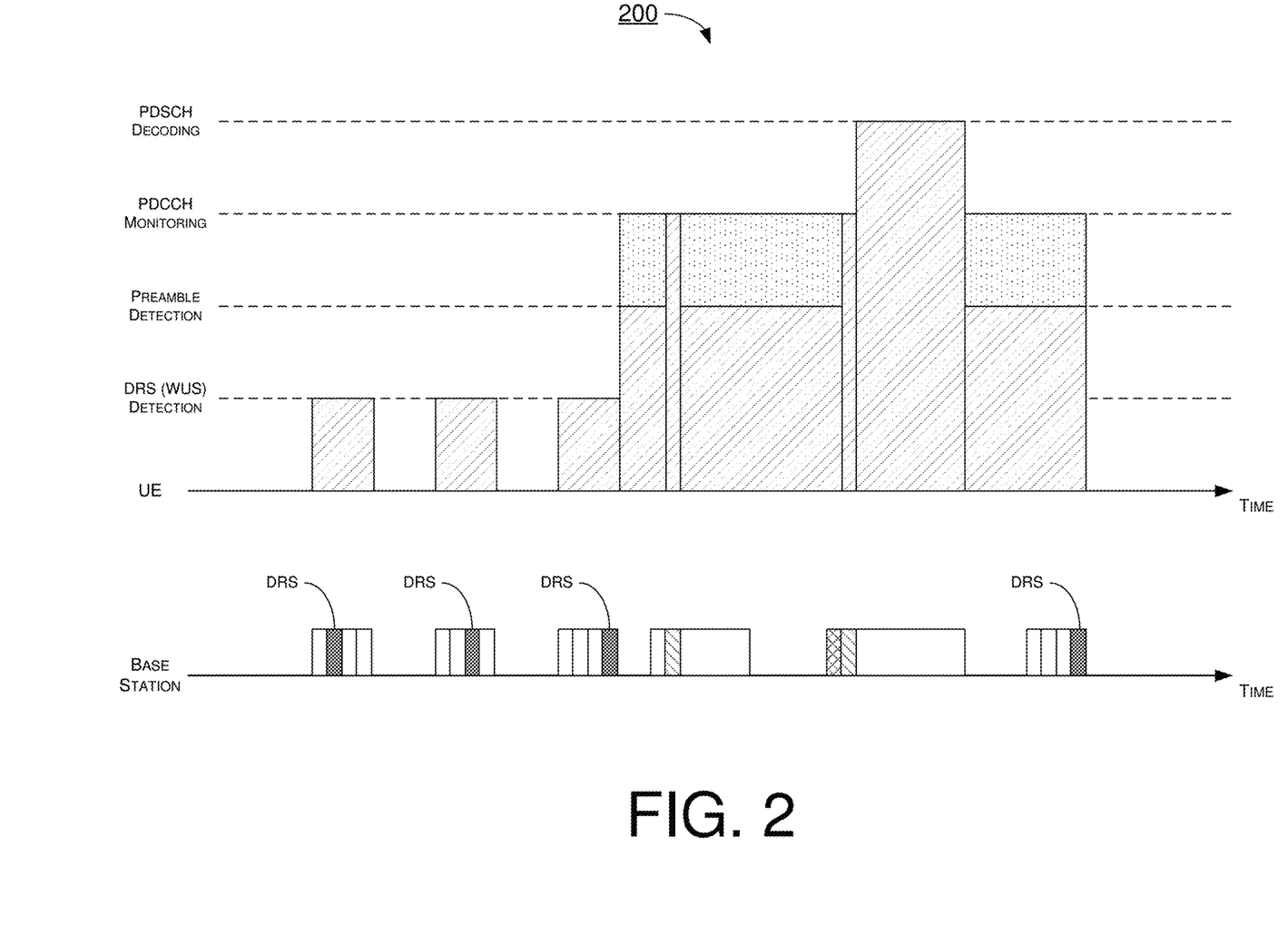
FIG. 2 is a diagram of an example scenario in accordance with the present disclosure.

FIG. 2 illustrates an example scenario 200 of usage of a WUS and a preamble under a proposed scheme in accordance with the present disclosure. In scenario 200, a WUS may be transmitted as part of a DRS. Under the proposed scheme, the WUS may be specific to a cell, a group of UEs or an individual UE.

In scenario 200, a WUS may be utilized by a base station (e.g., gNB) to wake up a given UE when downlink (DL) data for that UE is available and is to be transmitted by the base station. Each WUS may be specific to a given UE, a given group of UEs or a cell of UEs. Upon receiving or otherwise detecting a WUS that is specific to the UE (or a group or cell to which the UE belongs), the UE may start preamble detection. In the example shown in FIG. 2, it is the WUS embedded in the third DRS that is specific to the UE in scenario 200, and hence the UE does not respond to the WUS in each of the first two DRSs. Once the preamble is detected, the UE may perform PDCCH monitoring to check for uplink (UL) transmission grant(s) intended for the UE from the base station. Under the proposed scheme, the preamble may be used to carry the COT structure (which may be utilized by the UE to identify one or more time periods inside a COT during which the UE should execute PDCCH monitoring and/or physical downlink shared channel (PDSCH) acknowledgement/negative-acknowledgement transmission). The UE may also perform PDSCH decoding of data received via a PDSCH. Later on, the UE may receive another DRS with a WUS embedded therein that may signal the UE to enter a low-power mode (e.g., sleep mode), for example, when there is no data available for the UE and/or when there is no need for the UE to perform preamble detection.

Figure 3:
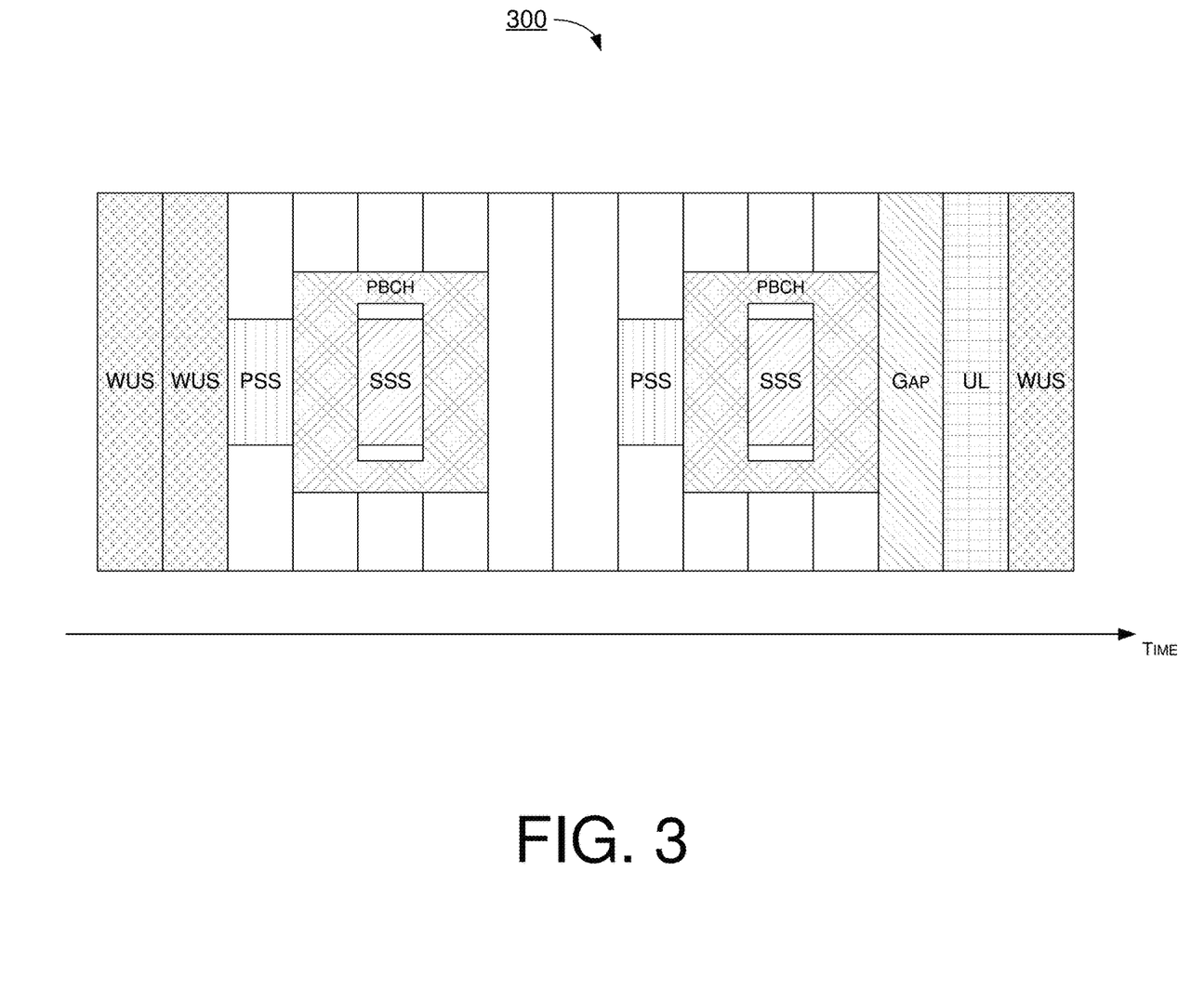
FIG. 3 is a diagram of an example scenario in accordance with the present disclosure.

FIG. 3 illustrates an example scenario 300 of design and operation of a WUS and a preamble under a proposed scheme in accordance with the present disclosure. In scenario 300, a plurality of UEs may be grouped into M groups with each of the M groups including N UEs. Each of the UEs may be informed by the base station of its group index via higher-layer configuration. Here, each of M and N may be a positive integer greater than 1.

Under the proposed scheme, a WUS may contain M bits that indicate which group(s) of UEs should wake up and start preamble detection and PDCCH monitoring. For operations in the non-standalone (NSA) mode (e.g., in a 5G network), the WUS may be carried in a licensed band by existing channels (e.g., PDCCH). For operations in the standalone (SA) mode (e.g., in a 5G network), the WUS may be a part of a DRS to reduce LBT overhead.

Under the proposed scheme, a UE may acknowledge reception of the WUS by transmission of a UE-specific signature. For operations in the NSA mode (e.g., in a 5G network), an acknowledgement (ACK) from the UE may be carried by a physical uplink control channel (PUCCH) in a licensed band. For operations in the SA mode (e.g., in a 5G network), the ACK from the UE may be transmitted via a last symbol of a DRS carrying slot, as shown in FIG. 3.

Under the proposed scheme, a UE may start to listen to a preamble once the UE is awake. The preamble may contain information related to COT structure that allows the UE to identify one or more locations where the UE should execute PDCCH monitoring or physical downlink shared channel (PDSCH) transmission of acknowledgement and/or negative acknowledgement (ACK/NACK).

Illustrative Implementations

Figure 4:
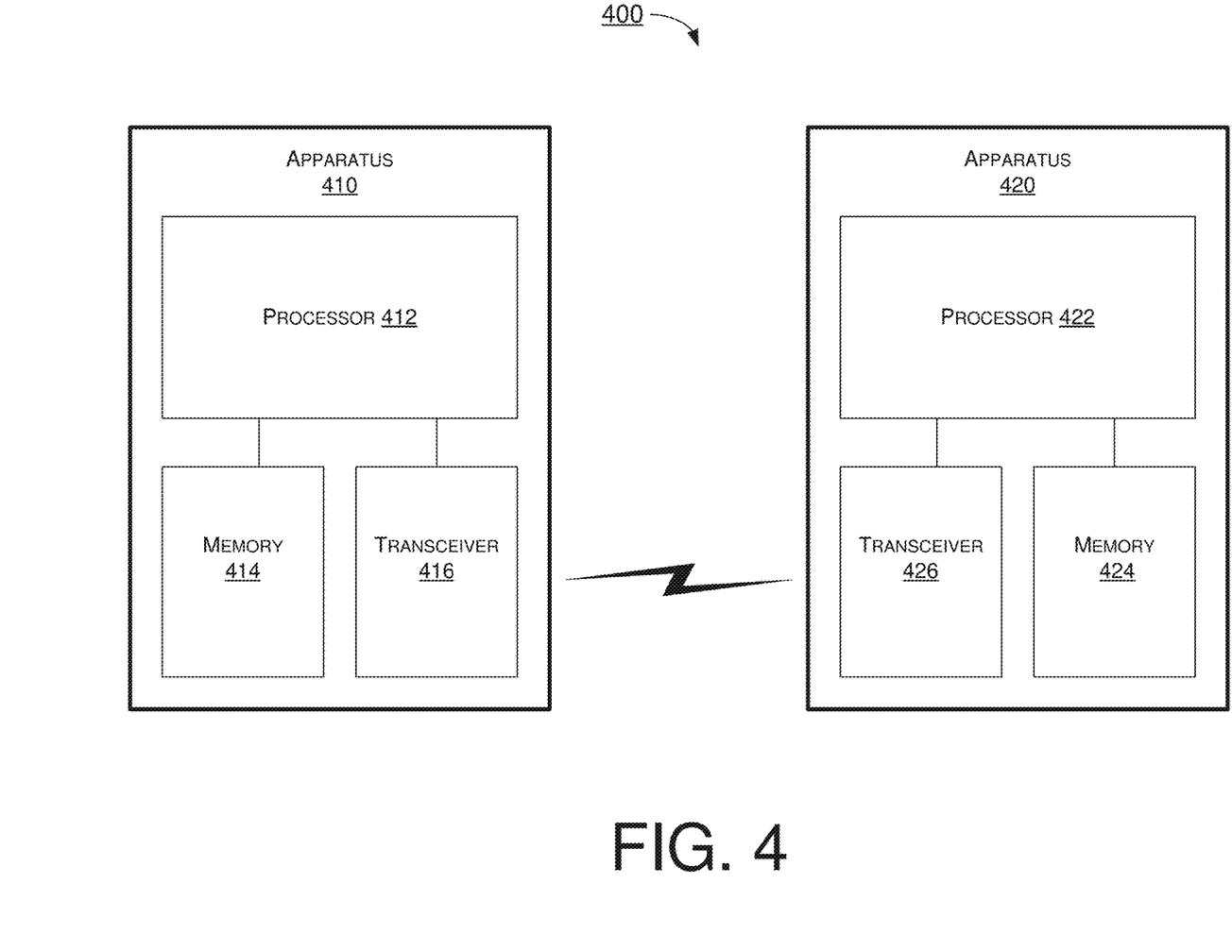
FIG. 4 is a block diagram of an example communication apparatus and an example network apparatus in accordance with an implementation of the present disclosure.

FIG. 4 illustrates an example system 400 having at least an example apparatus 410 and an example apparatus 420 in accordance with an implementation of the present disclosure. Each of apparatus 410 and apparatus 420 may perform various functions to implement schemes, techniques, processes and methods described herein pertaining to wake-up signal and preamble design for mobile communications, including the various schemes described above with respect to various proposed designs, concepts, schemes, systems and methods described above, including network environment 100, scenario 200 and scenario 300, as well as process 500 described below.

Each of apparatus 410 and apparatus 420 may be a part of an electronic apparatus, which may be a network apparatus or a UE (e.g., UE 110), such as a portable or mobile apparatus, a wearable apparatus, a wireless communication apparatus or a computing apparatus. For instance, each of apparatus 410 and apparatus 420 may be implemented in a smartphone, a smart watch, a personal digital assistant, a digital camera, or a computing equipment such as a tablet computer, a laptop computer or a notebook computer. Each of apparatus 410 and apparatus 420 may also be a part of a machine type apparatus, which may be an IoT apparatus such as an immobile or a stationary apparatus, a home apparatus, a wire communication apparatus or a computing apparatus. For instance, each of apparatus 410 and apparatus 420 may be implemented in a smart thermostat, a smart fridge, a smart door lock, a wireless speaker or a home control center. When implemented in or as a network apparatus, apparatus 410 and/or apparatus 420 may be implemented in an eNodeB in an LTE, LTE-Advanced or LTE-Advanced Pro network or in a gNB or TRP in a 5G network, an NR network or an IoT network.

In some implementations, each of apparatus 410 and apparatus 420 may be implemented in the form of one or more integrated-circuit (IC) chips such as, for example and without limitation, one or more single-core processors, one or more multi-core processors, or one or more complex-instruction-set-computing (CISC) processors. In the various schemes described above, each of apparatus 410 and apparatus 420 may be implemented in or as a network apparatus or a UE. Each of apparatus 410 and apparatus 420 may include at least some of those components shown in FIG. 4 such as a processor 412 and a processor 422, respectively, for example. Each of apparatus 410 and apparatus 420 may further include one or more other components not pertinent to the proposed scheme of the present disclosure (e.g., internal power supply, display device and/or user interface device), and, thus, such component(s) of apparatus 410 and apparatus 420 are neither shown in FIG. 4 nor described below in the interest of simplicity and brevity.

In one aspect, each of processor 412 and processor 422 may be implemented in the form of one or more single-core processors, one or more multi-core processors, or one or more CISC processors. That is, even though a singular term "a processor" is used herein to refer to processor 412 and processor 422, each of processor 412 and processor 422 may include multiple processors in some implementations and a single processor in other implementations in accordance with the present disclosure. In another aspect, each of processor 412 and processor 422 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 412 and processor 422 is a special-purpose machine specifically designed, arranged and configured to perform specific tasks including those pertaining to wake-up signal and preamble design for mobile communications in accordance with various implementations of the present disclosure.

In some implementations, apparatus 410 may also include a transceiver 416 coupled to processor 412. Transceiver 416 may be capable of wirelessly transmitting and receiving data. In some implementations, transceiver 416 may be capable of wirelessly communicating with different types of wireless networks of different radio access technologies (RATs). In some implementations, transceiver 416 may be equipped with a plurality of antenna ports (not shown) such as, for example, four antenna ports. That is, transceiver 416 may be equipped with multiple transmit antennas and multiple receive antennas for multiple-input multiple-output (MIMO) wireless communications. In some implementations, apparatus 420 may also include a transceiver 426 coupled to processor 422. Transceiver 426 may include a transceiver capable of wirelessly transmitting and receiving data. In some implementations, transceiver 426 may be capable of wirelessly communicating with different types of UEs/wireless networks of different RATs. In some implementations, transceiver 426 may be equipped with a plurality of antenna ports (not shown) such as, for example, four antenna ports. That is, transceiver 426 may be equipped with multiple transmit antennas and multiple receive antennas for MIMO wireless communications.

In some implementations, apparatus 410 may further include a memory 414 coupled to processor 412 and capable of being accessed by processor 412 and storing data therein. In some implementations, apparatus 420 may further include a memory 424 coupled to processor 422 and capable of being accessed by processor 422 and storing data therein. Each of memory 414 and memory 424 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 414 and memory 424 may include a type of read-only memory (ROM) such as mask ROM, programmable ROM (PROM), erasable programmable ROM (EPROM) and/or electrically erasable programmable ROM (EEPROM). Alternatively, or additionally, each of memory 414 and memory 424 may include a type of non-volatile random-access memory (NVRAM) such as flash memory, solid-state memory, ferroelectric RAM (Fe-RAM), magnetoresistive RAM (MRAM) and/or phase-change memory.

Each of apparatus 410 and apparatus 420 may be a communication entity capable of communicating with each other using various proposed schemes in accordance with the present disclosure. For illustrative purposes and without limitation, a description of capabilities of apparatus 410, as a UE, and apparatus 420, as a base station of a serving cell of a wireless network (e.g., 5G/NR mobile network), is provided below. It is noteworthy that, although the example implementations described below are provided in the context of a UE, the same may be implemented in and performed by a base station. Thus, although the following description of example implementations pertains to apparatus 410 as a UE (e.g., UE 110), the same is also applicable to apparatus 420 as a network node or base station such as a gNB, TRP or eNodeB (e.g., network node 125) of a wireless network (e.g., wireless network 120) such as a 5G NR mobile network.

Under a proposed scheme for wake-up signal and preamble design for mobile communications in accordance with the present disclosure, processor 412 of apparatus 410 may receive, via communication device 416, a wake-up signal (WUS) from a network (e.g., wireless network 120) via apparatus 420 as a base station when apparatus 410 is in a first mode of operation. Additionally, processor 412 may switch, responsive to receiving the WUS, to a second mode of operation from the first mode of operation. Moreover, processor 412 may detect, via communication device 416, a preamble in downlink (DL) transmissions from the network. Furthermore, processor 412 may monitor, via communication device 416 and responsive to detecting the preamble, a physical downlink control channel (PDCCH) to check for a transmission grant for apparatus 410 from the network.

In some implementations (e.g., in the standalone (SA) mode), in receiving the WUS, processor 410 may receive a discovery reference signal (DRS) in which the WUS is embedded. Advantageously, LBT overhead may thereby be reduced.

In some implementations (e.g., in the non-standalone (NSA) mode), in receiving the WUS, processor 410 may receive the WUS which is carried in a licensed band by one or more existing channels.

In some implementations, the preamble may carry information related to a channel occupancy time (COT) structure of a COT. In some implementations, in monitoring the PDCCH, processor 412 may perform certain operations. For instance, processor 412 may identify, based on the COT structure, one or more time periods inside the COT during which PDCCH monitoring or transmission of acknowledgement (ACK) or negative acknowledgement (NACK) is to be performed. Moreover, processor 412 may monitor the PDCCH during the one or more identified time periods inside the COT such that a time spent on monitoring of the PDCCH based on the structure of the COT is less than a time spent on monitoring of the PDCCH without knowledge of the COT structure.

In some implementations, the WUS may be specific to apparatus 410, a group of UEs to which apparatus 410 belongs, or a wireless communication cell with which apparatus 410 is associated. In some implementations, the network may be in wireless communications with a plurality of user equipment (UEs) grouped into M groups each comprising respective multiple UEs, with wherein M being a positive integer greater than 1. In such cases, the WUS may be specific to at least one of the M groups to which apparatus 410 belongs. In some implementations, the WUS may contain M bits that indicate which one or more of the M groups of UEs are to wake up to start preamble detection and PDCCH monitoring. In such cases, processor 412 may further receive, via communication device 416 and via a higher-layer configuration, a group index via indicating to which one of the M groups apparatus 410 belongs.

In some implementations, processor 412 may also switch back to the first mode of operation from the second mode of operation responsive to receiving another WUS (which may be embedded in another DRS) instructing entry into the first mode of operation. In some implementations, the first mode of operation may be a low-power mode or a sleep mode, and the second mode operation may be a normal operational mode in which apparatus 410 consumes more power than in the low-power mode or the sleep mode.

In some implementations, processor 412 may also perform, via communication device 416, an UL transmission responsive to receiving an UL transmission grant from the network. Alternatively, processor 412 may also perform, via communication device 416, a DL transmission responsive to receiving a DL transmission grant from the network.

In some implementations (e.g., in the standalone (SA) mode), processor 412 may also acknowledge, via communication device 416, to the network receipt of the WUS using a last symbol of a DRS carrying slot.

In some implementations (e.g., in the non-standalone (NSA) mode), processor 412 may also acknowledge, via communication device 416, to the network receipt of the WUS using a physical uplink control channel (PUCCH) in a licensed band.

Illustrative Processes

Figure 5:
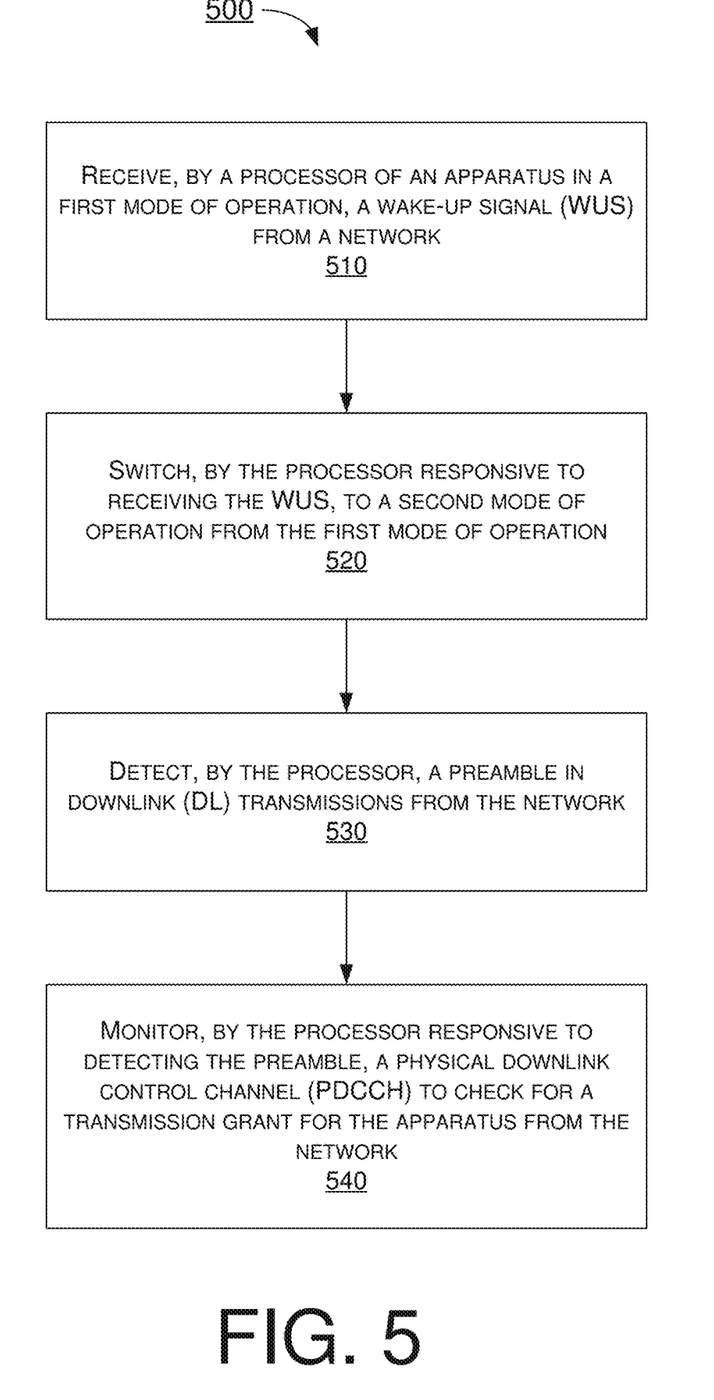
FIG. 5 is a flowchart of an example process in accordance with an implementation of the present disclosure.

FIG. 5 illustrates an example process 500 in accordance with an implementation of the present disclosure. Process 500 may be an example implementation of network environment 100, scenario 200, scenario 300 and/or communication system 400, whether partially or completely, with respect to various proposed schemes pertaining to wake-up signal and preamble design for mobile communications in accordance with the present disclosure. Process 500 may represent an aspect of implementation of features of communication apparatus 410. Process 500 may include one or more operations, actions, or functions as illustrated by one or more of blocks 510, 520, 530 and 540. Although illustrated as discrete blocks, various blocks of process 500 may be divided into additional blocks, combined into fewer blocks, or eliminated, depending on the desired implementation. Moreover, the blocks of process 500 may executed in the order shown in FIG. 5 or, alternatively, in a different order. Process 500 may be implemented by apparatus 410 as a UE or machine type device in wireless communication with apparatus 420 as a base station (e.g., gNB) of a wireless network (e.g., 5G/NR mobile network). Solely for illustrative purposes and without limitation, process 500 is described below in the context of apparatus 410. Process 500 may begin at block 510.

At 510, process 500 may involve processor 412 of apparatus 410 receiving, via communication device 416, a wake-up signal (WUS) from a network (e.g., wireless network 120) via apparatus 420 as a base station when apparatus 410 is in a first mode of operation. Process 500 may proceed from 510 to 520.

At 520, process 500 may involve processor 412 switching, responsive to receiving the WUS, to a second mode of operation from the first mode of operation. Process 500 may proceed from 520 to 530.

At 530, process 500 may involve processor 412 detecting, via communication device 416, a preamble in downlink (DL) transmissions from the network. Process 500 may proceed from 530 to 540.

At 540, process 500 may involve processor 412 monitoring, via communication device 416 and responsive to detecting the preamble, a physical downlink control channel (PDCCH) to check for a transmission grant for apparatus 410 from the network.

In some implementations, in receiving the WUS, process 500 may involve processor 410 receiving a discovery reference signal (DRS) in which the WUS is embedded.

In some implementations, in receiving the WUS, process 500 may involve processor 410 receiving the WUS which is carried in a licensed band by one or more existing channels.

In some implementations, the preamble may carry information related to a channel occupancy time (COT) structure of a COT. In some implementations, in monitoring the PDCCH, process 500 may involve processor 412 performing certain operations. For instance, process 500 may involve processor 412 identifying, based on the COT structure, one or more time periods inside the COT during which PDCCH monitoring or transmission of acknowledgement (ACK) or negative acknowledgement (NACK) is to be performed. Moreover, process 500 may involve processor 412 monitoring the PDCCH during the one or more identified time periods inside the COT such that a time spent on monitoring of the PDCCH based on the structure of the COT is less than a time spent on monitoring of the PDCCH without knowledge of the COT structure.

In some implementations, the WUS may be specific to apparatus 410, a group of UEs to which apparatus 410 belongs, or a wireless communication cell with which apparatus 410 is associated. In some implementations, the network may be in wireless communications with a plurality of user equipment (UEs) grouped into M groups each comprising respective multiple UEs, with wherein M being a positive integer greater than 1. In such cases, the WUS may be specific to at least one of the M groups to which apparatus 410 belongs. In some implementations, the WUS may contain M bits that indicate which one or more of the M groups of UEs are to wake up to start preamble detection and PDCCH monitoring. In such cases, process 500 may further involve processor 412 receiving, via communication device 416 and via a higher-layer configuration, a group index via indicating to which one of the M groups apparatus 410 belongs.

In some implementations, process 500 may further involve processor 412 switching back to the first mode of operation from the second mode of operation responsive to receiving another WUS instructing entry into the first mode of operation. In some implementations, the first mode of operation may be a low-power mode or a sleep mode, and the second mode operation may be a normal operational mode in which apparatus 410 consumes more power than in the low-power mode or the sleep mode.

In some implementations, process 500 may further involve processor 412 performing, via communication device 416, an UL transmission responsive to receiving an UL transmission grant from the network. Alternatively, process 500 may further involve processor 412 performing, via communication device 416, a DL transmission responsive to receiving a DL transmission grant from the network.

In some implementations, process 500 may further involve processor 412 acknowledging, via communication device 416, to the network receipt of the WUS using a last symbol of a DRS carrying slot.

In some implementations, process 500 may further involve processor 412 acknowledging, via communication device 416, to the network receipt of the WUS using a physical uplink control channel (PUCCH) in a licensed band.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
 receiving, by a processor of an apparatus in a first mode of operation, a wake-up signal (WUS) from a network;
 switching, by the processor responsive to receiving the WUS, to a second mode of operation from the first mode of operation;
 detecting, by the processor, a preamble in downlink (DL) transmissions from the network, the preamble carrying information related to a channel occupancy time (COT) structure and a beginning of a COT;

identifying, by the processor based on the preamble:
- a first time period inside the COT during which physical downlink control channel (PDCCH) monitoring is performed,
- a second time period inside the COT during which physical downlink shared channel (PDSCH) monitoring is performed, and
- a third time period inside the COT during which transmission acknowledgement (ACK) and negative acknowledgement (NACK) is performed;

monitoring, by the processor responsive to detecting the preamble, a PDCCH during the first time period inside the COT to check for a transmission grant for the apparatus from the network; and transmitting, by the processor, to the network an acknowledgement of receipt of the WUS by using one symbol in a discovery reference signal (DRS) carrying slot, with the acknowledgement being a last symbol among a plurality of symbols in the DRS carrying slot.

2. The method of claim 1, wherein the receiving of the WUS comprises receiving a DRS in which the WUS is embedded.

3. The method of claim 1, wherein the receiving of the WUS comprises receiving the WUS which is carried in a licensed band by one or more existing channels.

4. The method of claim 1, wherein a time spent on monitoring of the PDCCH based on the structure of the COT is less than a time spent on monitoring of the PDCCH without knowledge of the COT structure.

5. The method of claim 1, wherein the WUS is specific to the apparatus, a group of user equipment (UEs) to which the apparatus belongs, or a wireless communication cell with which the apparatus is associated.

6. The method of claim 5, wherein the network is in wireless communications with a plurality of user equipment (UEs) grouped into M groups each comprising respective multiple UEs, wherein the WUS is specific to at least one of the M groups to which the apparatus belongs, wherein the WUS contains M bits that indicate which one or more of the M groups of UEs are to wake up to start preamble detection and PDCCH monitoring, and wherein M is a positive integer greater than 1.

7. The method of claim 6, further comprising:
receiving, by the processor via a higher-layer configuration, a group index via indicating to which one of the M groups the apparatus belongs.

8. The method of claim 1, further comprising:
switching, by the processor, back to the first mode of operation from the second mode of operation responsive to receiving another WUS instructing entry into the first mode of operation.

9. The method of claim 8, wherein the first mode of operation comprises a low-power mode or a sleep mode, and wherein the second mode operation comprises a normal operational mode in which the apparatus consumes more power than in the low-power mode or the sleep mode.

10. The method of claim 1, further comprising:
performing, by the processor, an uplink (UL) transmission responsive to receiving an UL transmission grant from the network; or
performing, by the processor, a downlink (DL) transmission responsive to receiving a DL transmission grant from the network.

11. The method of claim 1, further comprising:
acknowledging, by the processor, to the network receipt of the WUS using a physical uplink control channel (PUCCH) in a licensed band.

12. An apparatus, comprising:
a communication device which, during operation, wirelessly communicates with a network; and
a processor coupled to the communication device such that, during operation, the processor performs operations comprising:
receiving, via the communication device when in a first mode of operation, a wake-up signal (WUS) from a network;
switching, responsive to receiving the WUS, to a second mode of operation from the first mode of operation;
detecting, via the communication device, a preamble in downlink (DL) transmissions from the network, the preamble carrying information related to a channel occupancy time (COT) structure and a beginning of a COT;
identifying based on the preamble:
- a first time period inside the COT during which physical downlink control channel (PDCCH) monitoring is performed,
- a second time period inside the COT during which physical downlink shared channel (PDSCH) monitoring is performed, and
- a third time period inside the COT during which transmission acknowledgement (ACK) and negative acknowledgement (NACK) is performed;
monitoring, via the communication device responsive to detecting the preamble, a PDCCH during the first time period inside the COT to check for a transmission grant for the apparatus from the network; and
transmitting, via the communication device, to the network an acknowledgement of receipt of the WUS by using one symbol in a discovery reference signal (DRS) carrying slot, with the acknowledgement being a last symbol among a plurality of symbols in the DRS carrying slot,
wherein the WUS is specific to the apparatus, a group of user equipment (UE) to which the apparatus belongs, or a wireless communication cell with which the apparatus is associated.

13. The apparatus of claim 12, wherein, in receiving the WUS, the processor performs operations comprising either:
receiving a DRS in which the WUS is embedded; or
receiving the WUS which is carried in a licensed band by one or more existing channels.

14. The apparatus of claim 12, wherein a time spent on monitoring of the PDCCH based on the structure of the COT is less than a time spent on monitoring of the PDCCH without knowledge of the COT structure.

15. The apparatus of claim 12, wherein the network is in wireless communications with a plurality of user equipment (UEs) grouped into M groups each comprising respective multiple UEs, wherein the WUS is specific to at least one of the M groups to which the apparatus belongs, wherein the WUS contains M bits that indicate which one or more of the M groups of UEs are to wake up to start preamble detection and PDCCH monitoring, wherein M is a positive integer greater than 1, and wherein the processor further performs operations comprising:
receiving, by the processor via a higher-layer configuration, a group index via indicating to which one of the M groups the apparatus belongs.

16. The apparatus of claim 12, wherein the processor further performs operations comprising one or more of:
switching back to the first mode of operation from the second mode of operation responsive to receiving another WUS instructing entry into the first mode of operation,
wherein the first mode of operation comprises a low-power mode or a sleep mode, and wherein the second mode operation comprises a normal operational mode in which the apparatus consumes more power than in the low-power mode or the sleep mode.

17. The apparatus of claim 12, wherein the processor further performs operations comprising:
performing, via the communication device, an uplink (UL) transmission responsive to receiving an UL transmission grant from the network; or
performing, via the communication device, a downlink (DL) transmission responsive to receiving a DL transmission grant from the network.

\* \* \* \* \*